United States Patent [19]

Jones et al.

[11] Patent Number: 4,625,541
[45] Date of Patent: Dec. 2, 1986

[54] APPARATUS FOR PATTERNING A CYLINDRICAL SURFACE

[76] Inventors: Lloyd Jones, 501 Taylor Rd., Greer, S.C. 29651; Larry Jones, Rte. 5, Box 31, Simpsonville, S.C. 29681

[21] Appl. No.: 791,939

[22] Filed: Oct. 28, 1985

[51] Int. Cl.⁴ ............................................. B21J 7/46
[52] U.S. Cl. ........................................ 72/421; 72/76
[58] Field of Search ................. 72/80, 81, 76, 53, 421; 409/170

[56] References Cited

U.S. PATENT DOCUMENTS

| | | |
|---|---|---|
| 372,669 | 11/1887 | Gowen ..................................... 72/76 |
| 1,398,320 | 11/1921 | Dunsworth . |
| 1,483,328 | 2/1924 | Booker .................................... 72/76 |
| 1,695,617 | 12/1928 | Teissere et al. ......................... 72/76 |
| 2,051,031 | 8/1936 | Dilks . |
| 2,326,536 | 8/1943 | Hartsock et al. . |
| 2,568,450 | 9/1951 | Hjarpe ................................... 409/170 |
| 3,108,358 | 10/1963 | Dengle et al. ....................... 409/170 |
| 3,405,600 | 10/1968 | Ballard et al. ...................... 409/170 |
| 3,432,973 | 3/1969 | Heinrich . |
| 3,815,399 | 6/1974 | Foulks et al. . |
| 3,957,385 | 5/1976 | Lupke . |
| 3,983,773 | 10/1976 | Davis et al. . |
| 4,138,908 | 2/1979 | Kampmann et al. ................... 72/76 |
| 4,457,200 | 7/1984 | Borzym . |

*Primary Examiner*—Lowell A. Larson
*Attorney, Agent, or Firm*—Dority & Manning

[57] ABSTRACT

An apparatus for patterning a cylindrical surface comprises a punch held by a holder connected to an arm which is pivotally mounted to permit the punch to strike the cylindrical surface. The cylindrical surface is mounted on a spool which can be rotated relative to the punch. A platform supporting the pivot point for the arm engages a worm gear which can be rotated to translate the platform along the length of the worm gear. The apparatus further comprises at least one source of pressurized fluid, a plurality of pairs of pressure chambers, a piston slidable between each pair of pressure chambers, a dual action on/off valve connecting the pressure source with one of the pressure chambers of each pair, a plurality of restriction valves for regulating the flow of pressurized fluid to each of the pressure chambers, and a programmable controller having a plurality of input and output leads, a plurality of timers, a plurality of counters, at least one high speed counter, and at least one reverse counter.

19 Claims, 8 Drawing Figures

APPARATUS FOR PATTERNING A CYLINDRICAL SURFACE

BACKGROUND OF THE INVENTION

The present invention relates to an apparatus for patterning a cylindrical surface, and specifically to an apparatus for patterning a die or a mill.

A conventional apparatus for patterning a cylindrical surface of a die or a mill is shown in FIG. 1 and indicated generally by the numeral 10. Conventional patterning apparatus 10 includes a punch 12 which is held by a punch holder 14 attached to a holder arm 16. The middle of holder arm 16 is pivotally connected to an arm support member 18 (partially obscured in FIG. 1.) so as to permit punch 12 to be moved up and down in a single plane. Arm support member 18 is fixedly attached to a traveling support member 20 which slidably rests atop a machine base 22. A vertical punch stop 24 is attached to arm support member 18 and can be adjusted to limit the vertical movement of arm 16.

Punch 12 comprises a tool for marking a blank cylinder 26 to be patterned into a die or a mill, as desired. The size and shape of punch 12 varies according to the pattern desired to be produced on blank cylinder 26, which has a journal 25 integrally formed on each end thereof. Each journal 25 is mounted rotatably on a center as known in the art, with one journal (not shown) held by a dog (not shown).

In operation, a human operator manually raises holder 14 until arm 16 contacts stop 24. The operator then releases holder 14 and permits punch 12 to strike the surface of blank cylinder 26, thereby imprinting a mark into the surface of blank cylinder 26. The operator may then inspect the mark so formed and accordingly may repeat the procedure several times until the desired depth is obtained in the surface of cylinder 26. The position of stop 24 also affects the depth of the mark, since this position determines the height from which punch 12 is released.

Each mark so formed in the surface of cylinder 26 constitutes only one small portion of the overall pattern to be formed in the surface of cylinder 26. The overall pattern is produced by exposing different sections of the surface of blank cylinder 26 to the strike of punch 12. In conventional apparatus 10, one center is supported by a center support member 29. The dog (not shown) holding the other journal is connected to the central axis of a first metering disc 30. The circumference of metering disc 30 has a plurality of teeth 32. Each tooth 32 is spaced equidistantly from the next adjacent tooth 32 around the circumference of disc 30. Because of the direct connection between disc 30 and the obscured dog, a single revolution of disc 30 causes a single revolution of this dog and accordingly blank cylinder 26 held thereby. Rotational movement of the surface of cylinder 26 can be very precisely controlled by rotation of disc 30 because of the disparity in diameter between cylinder 26 and disc 30.

In operation, the human operator determines how far the surface of cylinder 26 must be rotated to expose the desired portion of the blank surface to receive the next strike of punch 12 required to form the next section of the overall pattern being produced on the surface of cylinder 26. Then the operator calculates the corresponding rotation of disc 30 in terms of the number of teeth 32 through which disc 30 must be rotated. A first shifting arm 34 pivots at one end about the axis of disc 30 and has a handle 36 at the opposite end thereof. A ratchet pawl (not shown) is attached to arm 34 near handle 36 and engages teeth 32 of disc 30. The operator lifts handle 36 until the pawl ratchets over the desired number of teeth 32. Then the operator brings the handle back down until arm 34 engages a lower arm stop 38, which can be adjusted to stop arm 34 at different heights. Disc 30 rotates in conjunction with the downward stroke of handle 36, and accordingly, the surface of cylinder 26 moves the desired distance relative to punch 12 that is required for receiving the imprint of the next punch strike. This procedure can be followed until punch 12 has marked a complete circumferential portion around the surface of cylinder 26. Moreover, an upper arm stop, such as bolt and nut combination 40, can be attached to a first arm gauge 41, which is secured to machine base 22 between first shifting arm 34 and first shifting disc 30. Bolt and nut combination 40 can be set at a point at which arm 34 will have moved a sufficient distance to reach the desired tooth of disc 30.

The operator must perform another operation with conventional apparatus 10 in order to move punch 12 along the longitudinal axis of cylinder 26 in preparation for striking another series of marks around a different circumferential portion of the cylinder surface. As described above, holder arm 16 is pivotally attached to arm support member 18 which is fixed to travelling support member 20. The upper surface of machine base 22 slidably supports travelling support member 20. In addition, machine base 22 has a rectangular opening 42 extending from one end thereof to that portion of machine base 22 which supports metering disc 30. Travelling support member 20 has a rectangular tongue portion (not shown) which slidably fits between the sides of rectangular opening 42. A threaded worm gear receptacle (not shown) extends through the tongue portion of travelling support member 20. One end of a threaded worm gear (not shown) screws into the threaded worm gear receptacle of travelling support member 20. The other end of this worm gear is fixed to the center of a second metering disc 44, which has a plurality of teeth 46 equidistantly spaced around the circumference thereof. A portion of the worm gear near to the end fixed to second disc 44 is rotatably supported in a bearing (not shown) which is attached to machine base 22. Rotation of second disc 44 rotates the worm gear inside the tongue portion of travelling support member 20, and accordingly, travelling support member 20 is translated along the upper surface of machine base 22 toward or away from second disc 44, depending upon whether the worm gear is rotated clockwise or counter-clockwise. Arm support member 18 and punch 12 are translated along with travelling support member 20 to and fro relative to blank cylinder 26, which is rotatably mounted between the centers.

In operation, the operator determines the distance along the longitudinal axis of cylinder 26 that punch 12 must travel relative to cylinder 26 in order to be positioned over the blank portion of cylinder 26 that is to receive the next mark of the punch. The spacing between each tooth 46 of second disc 44 corresponds to a precise longitudinal distance of travel along the longitudinal axis of cylinder 26 by travelling support member 20 relative to cylinder 26. The operator raises a second handle 48 which is attached to a second shifting arm 50. A ratchet pawl is attached to the side of second shifting arm 50 that is out of view in FIG. 1. The operator lifts second handle 48 until the ratchet pawl ratchets past the desired number of teeth 46. Then, the operator moves the handle back down until second shifting arm 50 touches a lower arm stop, such as a bolt and nut combination 52. A second arm gauge 53 is fixed to machine base 22 alongside second shifting arm 50. Another nut and bolt combination 54 can be mounted on second arm gauge 53 to act as an upper stop for arm 50.

Accordingly, the operator of conventional apparatus 10 is able to form a punched pattern of predetermined design on the surface of cylinder 26 by manipulating punch 12, first handle 36, and second handle 48 in a predetermined sequence calling for shifting a predetermined number of teeth 32 and 46 along respective discs 30 and 44.

Forming a single pattern on a single blank cylinder using a conventional apparatus is a very time consuming and repetitive task requiring painstaking care of the operator to strike the cylinder with punch 12 the desired number of times and to shift shifting arms 34 and 50 in the required sequence. Operation of the conventional apparatus requires a skilled individual with the judgment to set the punch to strike the correct portion of the blank cylinder and to strike it with the proper force. In addition, the operator must possess the patience and care needed to devote many hours to the repetitive task of operating the conventional apparatus. Even the simplest of patterns formed on a blank cylinder can require several weeks of work by a single operator using the conventional apparatus.

Accordingly, patterning a blank cylinder using a conventional apparatus is a very expensive manufacturing operation. This is primarily due to the labor expense of the operator of the conventional apparatus. Successful operators are rare individuals due to the great care, precision and detail that are characteristic of the work required of the operator of the conventional apparatus.

OBJECTS AND SUMMARY OF THE INVENTION

It is a principal object of the present invention to provide an apparatus for patterning a cylindrical surface that is capable of completing the pattern at reduced cost over presently available apparatus and without any loss in the quality of the final product produced by the apparatus.

Another object of the present invention is to provide an apparatus for patterning a cylindrical surface that reduces the cost of patterning the surface by reducing the amount of time required of an operator to attend an individual apparatus during the patterning process and thereby freeing an operator to attend more than one such apparatus for patterning a cylindrical surface at the same time.

A further object of the present invention is to provide an apparatus for patterning a cylindrical surface that is capable of producing more complex patterns than are capable of being produced by conventional apparatus.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the apparatus of the present invention for patterning a cylindrical surface comprises means for marking the surface, first actuating means for actuating the marking means, means for translating the marking means relative to the cylindrical surface, second actuating means for actuating the translating means, means for rotating the cylindrical surface relative to the marking means, third actuating means for actuating the rotating means, and control means for controlling the relative order of actuating each of the first, second and third actuating means and further for controlling the frequency of actuating each of the first, second and third actuating means.

In the preferred embodiment of the invention, the means for marking the surface includes a punch attached to one end of a punch arm which is pivotally attached to a travelling support member. A vertical punch stop is provided to limit the upward movement of the punch arm.

In the preferred embodiment of the present invention, the means for translating the marking means relative to the cylindrical surface includes a threaded worm hole formed in the travelling support member, a worm gear having one end threadingly engaging the worm hole, a metering disc fixed to the other end of the worm gear and having a plurality of equidistantly spaced teeth around the circumference thereof, and a first shifting arm having a ratchet pawl engaging the teeth of the disc. A first arm gauge is provided near the first shifting arm, and an upper arm stop and a lower arm stop can be attached to the first arm gauge to limit the upward and downward movement of the first shifting arm.

The means for rotating the cylindrical surface relative to the marking means preferably comprises a dog which non-rotatably holds and supports one journal of the cylindrical member having the cylindrical surface to be patterned, a metering disc non-rotatably fixed to the dog and having a plurality of equidistantly spaced teeth around the circumference thereof, and a second shifting arm having a second ratchet pawl engaging the disc. A second arm gauge can be provided near the second shifting arm, and an upper arm stop and a lower arm stop can be adjustably mounted on the second arm gauge to limit the upward and downward movement of the second shifting arm.

In the preferred embodiment of the present invention, each of the first, second and third actuating means comprises a source of pressurized fluid, such as air for example, a first pressure chamber and a second pressure chamber, a piston slidable between the first and second pressure chambers, and a dual action on/off valve. The pressurized fluid source is selectively connected by the on/off valve to one of the first or second pressure chambers. In other words, in one operational mode of the on/off valve, the source is connected to one of the first and second pressure chambers. In the other operational mode of the on/off valve, the pressure source is connected to the other of the first and second pressure chambers. The piston of the first, second and third actuating means is connected respectively to the punch arm, the first shifting arm, and the second shifting arm.

In the preferred embodiment of the present invention, the control means includes a programmable controller. The controller of the preferred embodiment of the invention controls when each of the first, second and third on/off valves connects a source of pressurized fluid respectively to one of the first and second pressure chambers of each of the first, second and third actuating means, by sending electrical signals to actuate each on/off valve alternately between the "on" and "off" modes. Thus, the programmable controller is preprogrammed to generate electrical signals that actuate the correct number of strikes with the punch at each location along the surface of the cylinder to be patterned. The controller also operates the appropriate on/off valve the required number of times to ratchet each of the metering discs the required number of teeth to rotate the cylinder relative to the punch and translate the punch relative to the cylinder for the next striking sequence of the punch. Moreover, the overall pattern to be marked on the surface of the cylinder is stored in the memory of the programmable controller in terms of the sequence of strikes and ratcheting of teeth so that the entire pattern can be applied to the cylindrical surface.

In the preferred embodiment of the invention, means are provided to regulate the flow of pressurized fluid to each of the pressure chambers in each of the first, second and third actuating means. The regulating means preferably comprises a restriction valve inserted in each fluid line which connects each pressure chamber to one of the on/off valves. The restriction valve can be a manually adjustable screw-type valve.

The preferred embodiment of the present invention also includes means for selectively varying the pattern to be marked on the cylindrical surface. The selective pattern varying means preferably comprises a source of pressurized fluid, a pressure chamber connected to the source, a slidable piston forming one end of the pressure chamber, biasing means for biasing the piston against the force exerted by the pressure in the chamber, a restriction valve regulating the flow of pressurized fluid from the source to the chamber, a piston rod connected at one end to the piston, and a shim connected to the other end of the piston rod.

The accompanying drawings, which are incorporated in and constitute a part of this specification, illustrate one embodiment of the invention and, together with the description, serve to explain the principles of the invention.

DESCRIPTION OF THE PREFERRED EMBODIMENTS

Figure 1:
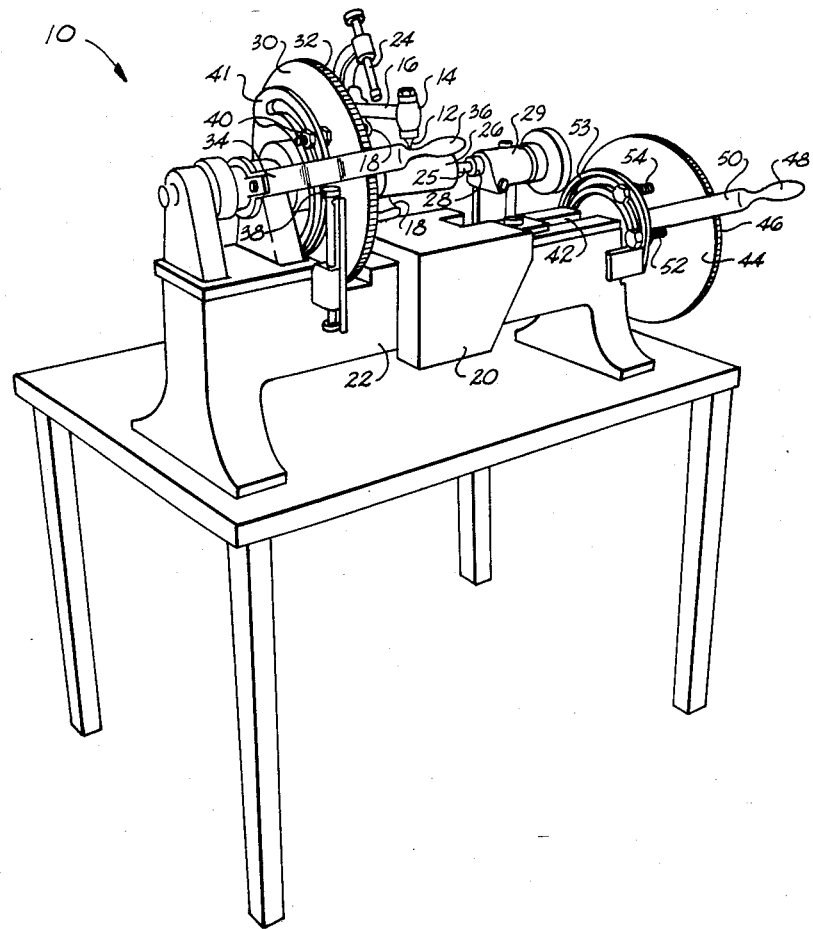
FIG. 1 is a perspective view of a conventional apparatus for patterning a cylindrical surface.
Figure 2:
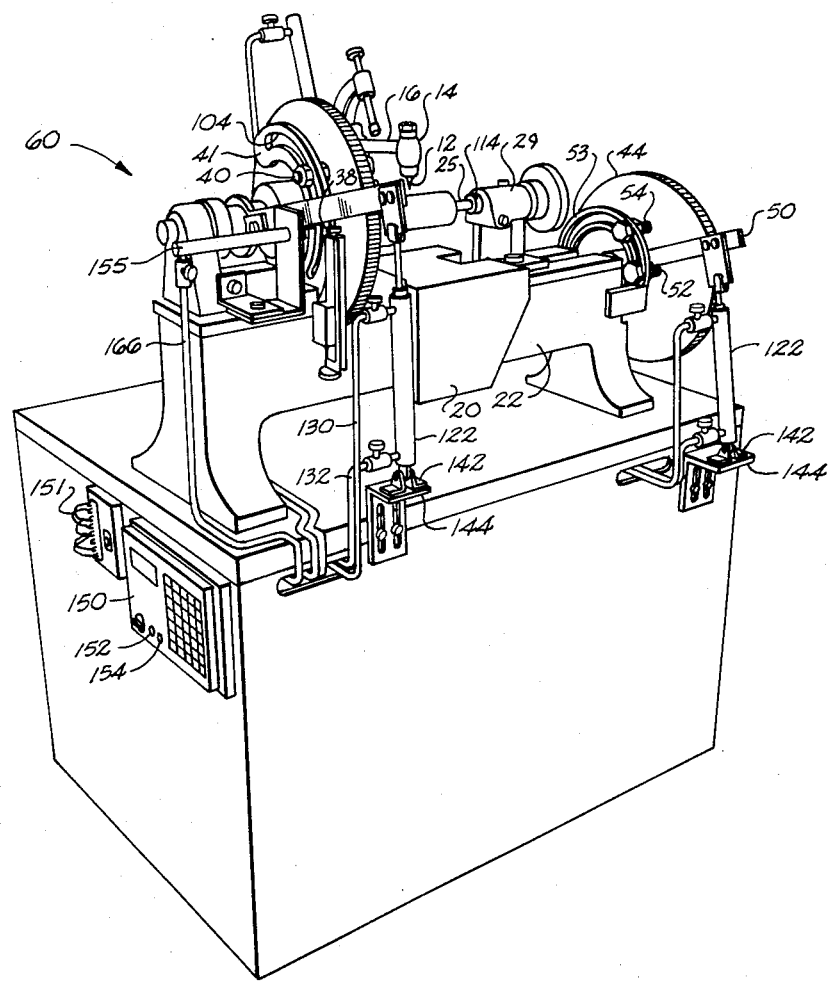
FIG. 2 is a perspective view of an embodiment according to the present invention.

Reference will now be made in detail to the present preferred embodiment of the invention, an example of which is illustrated in the accompanying drawings. patterning a cylindrical surface is shown in FIG. 2 and is represented generally by the numeral 60.

Figure 6:
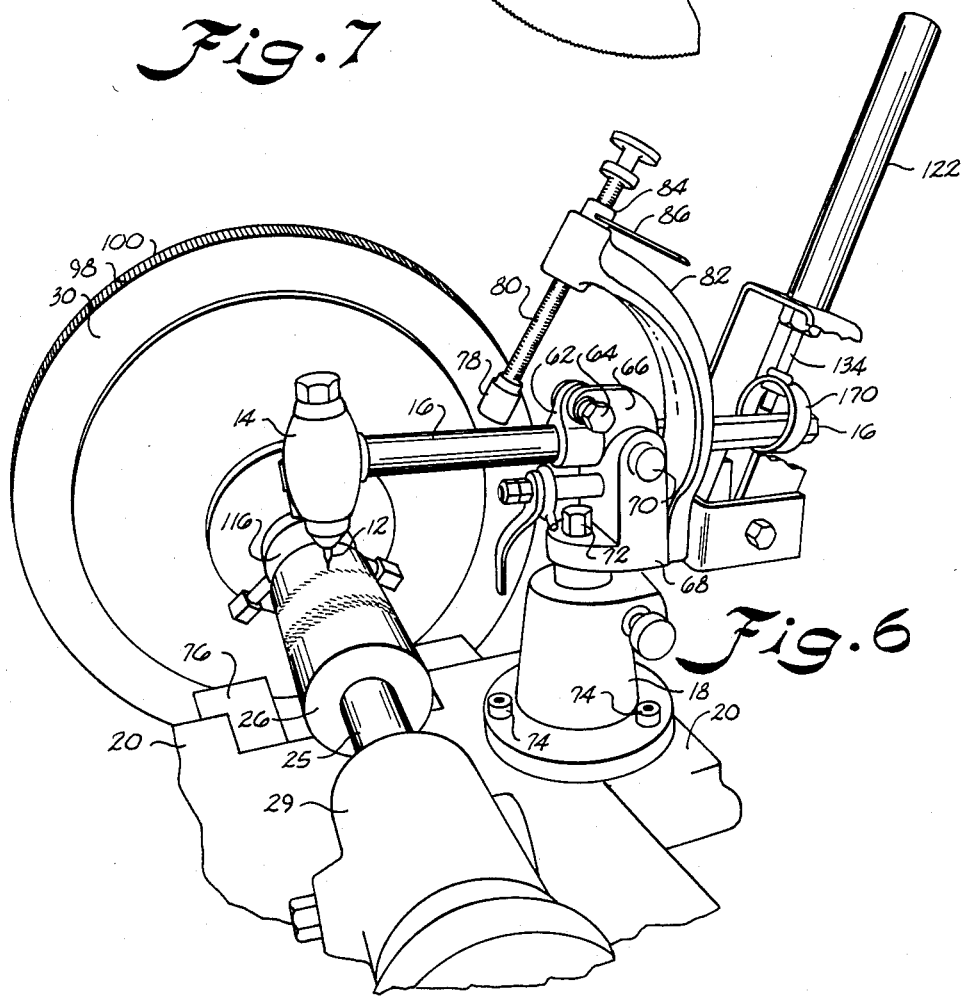
FIG. 6 is another perspective partial view of the embodiment of the invention of FIG. 2.

In accordance with the present invention, the apparatus for patterning a cylindrical surface comprises means for marking the surface. As embodied herein and shown for example, in FIGS. 2, 3, 4, 6 and 8, the means for marking the cylindrical surface preferably includes a punch tool 12 which is held by a punch holder 14. As shown in FIG. 6, one end of a holder arm 16 is attached to punch holder 14, and a gripping flange 62 surrounds a middle portion of holder arm 16. A gripping adjustment nut and bolt combination 64 can be tightened to prevent holder arm 16 from sliding relative to gripping flange 62. Gripping flange 62 is adjustably attached to a pivot flange 66, which is pivotally mounted to a swivel member 68 by a pivot shaft 70 extending through an upper portion of swivel member 68 and a lower portion of pivot flange 66. A swivel bolt 72 rotatably connects swivel member 68 to an arm support member 18 which is mounted on a travelling support member 20 by a plurality of threaded bolts 74. Travelling support member 20 slidably moves atop an upper surface 76 of a machine base 22.

As shown particularly in FIG. 6, an upper arm stop 78 is fixed to one end of a threaded stop support shaft 80. The threads of stop support shaft 80 engage a threaded opening in one end of a curved stop support flange 82. The distance which upper arm stop 78 projects from the threaded opening may be adjusted by rotating stop support shaft 80. A tightening nut 84 can be rotated on stop support shaft 80 to lock same against rotation and thereby maintain the desired distance over which arm stop 78 projects from the opening of stop support flange 82. A lever 86 extends from tightening nut 84 and facilitates rotation of same in either direction. Holder arm 16 can be pivoted about pivot shaft 70 until holder arm 16 touches upper arm stop 78.

In accordance with the present invention, an apparatus for patterning a cylindrical surface comprises means for translating the marking means relative to the cylindrical surface. As embodied herein and shown for example in one or more of FIGS. 2, 4–6 and 8, the means for translating the marking means relative to the cylindrical surface preferably includes a travelling support member 20 having a tongue portion 88 (FIG. 3) with a worm gear receptacle 90 (shown in phantom in FIG. 3), a machine base 22 having a two-sided rectangular opening 92 for receiving tongue portion 88 of travelling support member 20, a worm gear 94, a metering disc 44, and a shifting arm 50 having a ratchet pawl 96.

Figure 4:
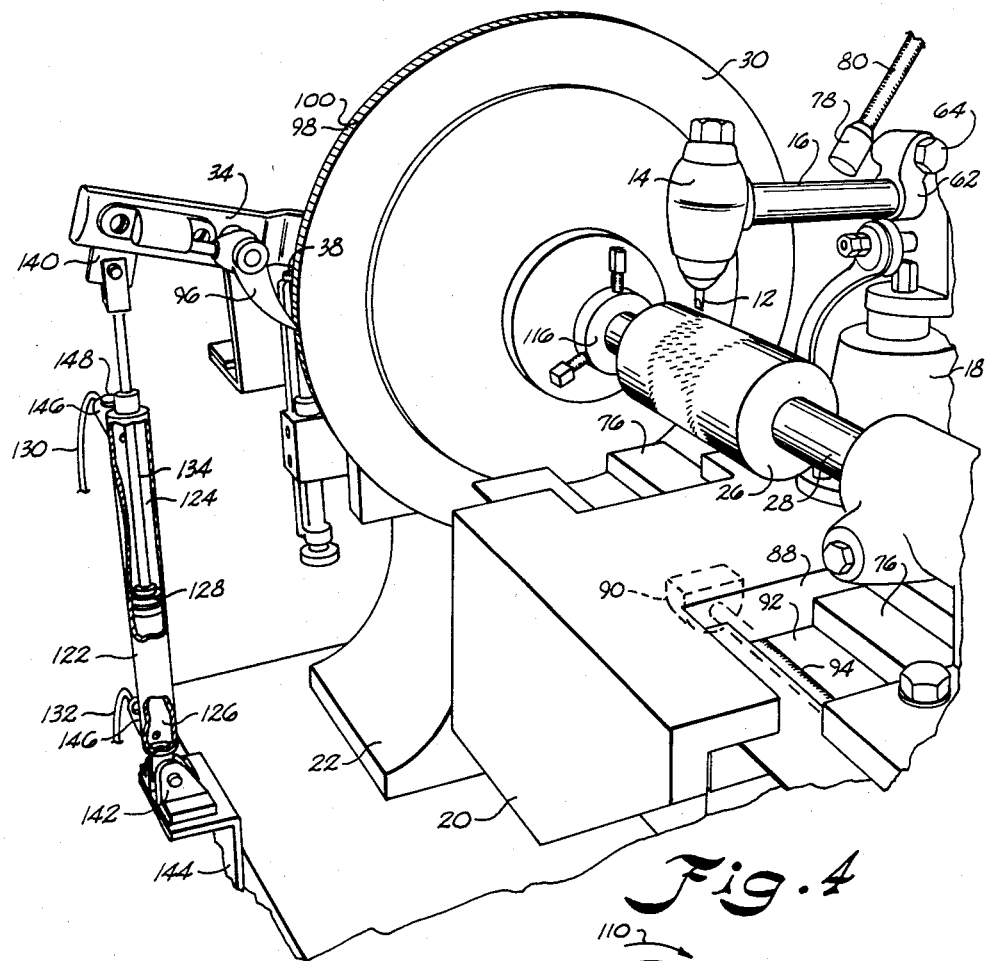
FIG. 4 is another perspective partial view of the embodiment of the invention shown in FIG. 2.
Figure 5:
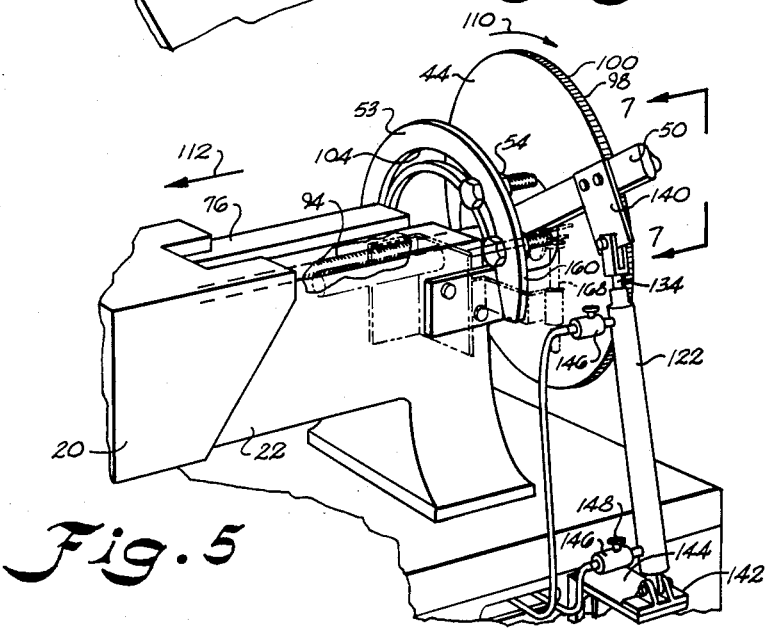
FIG. 5 is a broken, cut-away, perspective partial view of the embodiment of the invention of FIG. 2.

Travelling support member 20 has a centrally disposed tongue portion 88 and slides atop upper surface 76 of machine base 22. Tongue portion 88 fits between the sides of centrally located opening 92 of machine base 22. As shown particularly in FIG. 4, tongue portion 88 has a worm gear receptacle 90 which has an opening threaded to receive a worm gear 94. Receptacle 90 is held fixed relative to travelling support member 20 so that receptacle 90 cannot rotate relative to travelling support member 20. Worm gear 94 is rotatably mounted between the sides of central opening 92 and has one end which threadingly engages worm gear receptacle 90. As shown in FIG. 5, the other end of worm gear 94 is fixed to the center point of a metering disc 44, which has a plurality of equidistantly spaced indentations 98 around the circumference thereof. Between each pair of adjacent indentations 98 on disc 44, there is a raised portion or tooth 100. The peaks of adjacent teeth 100 are spaced equidistantly from each other. A shifting arm 50 has one end rotatably attached to the worm gear near the end of worm gear 94 fixed to the center of metering disc 44. A stop gauge 53 comprises a semi-circular flange having an arcuate concentric slot 104 therethrough and extending over substantially the entire length thereof. Stop gauge 53 is mounted to machine base 22 with worm gear 94 as the central axis thereof. A lower stop, such as a nut and bolt combination 52, is secured along slot 104 of gauge 53 in the downward path of shifting arm 50. An upper stop, such as a bolt of a nut and bolt combination 54, is secured along slot 104 of gauge 53 and extends into the upward path of shifting arm 50.

Figure 7:
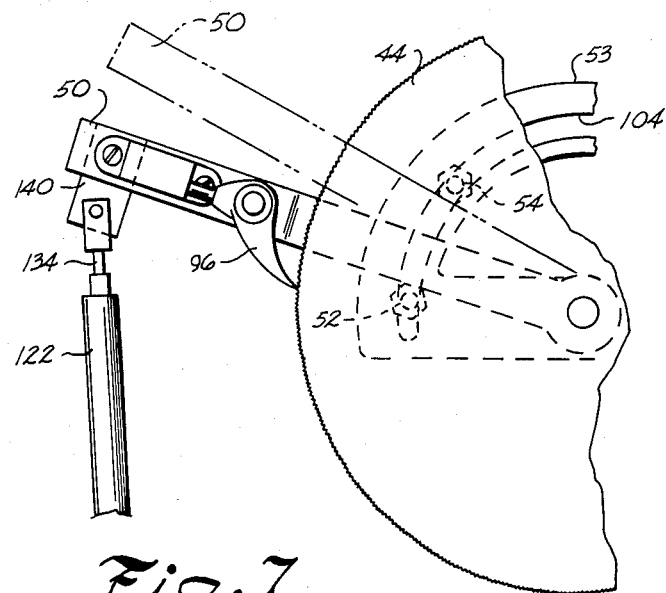
FIG. 7 is a plan view taken along the lines 7—7 of FIG. 5 and showing in shadow an alternative position of one of the components of a preferred embodiment of the invention.

A ratchet pawl 96 is mounted to one side of shifting arm 50, as shown in FIGS. 5 and 7. As shifting arm 50 is raised, pawl 96 ratchets over each tooth 100 on the circumference of metering disc 44. When shifting arm 50 is prevented from further upward movement by the upper arm stop, shifting arm 50 comes to rest. When shifting arm 50 comes to rest, pawl 96 rests in one of indentations 98 in the circumference of metering disc 44 between adjacent teeth 100. With pawl 96 so engaged with metering disc 44, downward movement of shifting arm 50 causes rotation of metering disc 44 until shifting arm 50 contacts the lower stop. FIG. 7 shows in phantom the upwardmost stopping point of shifting arm 50, the lowermost stopping point of shifting arm 50, and the portion of stop gauge 53 to which nut and bolt combinations 52, 54 are secured.

Referring to FIG. 5, as metering disc 44 rotates in the direction of a curved arrow 110, worm gear 94 rotates in the same direction and engages receptacle 90. Since receptacle 90 cannot rotate relative to travelling support member 20, lateral translational movement is effected between machine base 22 and travelling support member 20. A straight arrow 112 indicates the direction in which travelling support member 20 is translated as metering disc 44 is rotated in the direction shown by curved arrow 110. Thus, rotational movement of metering disc 44 is transformed into lateral translation of the travelling support and the marking means attached thereto.

Figure 3:
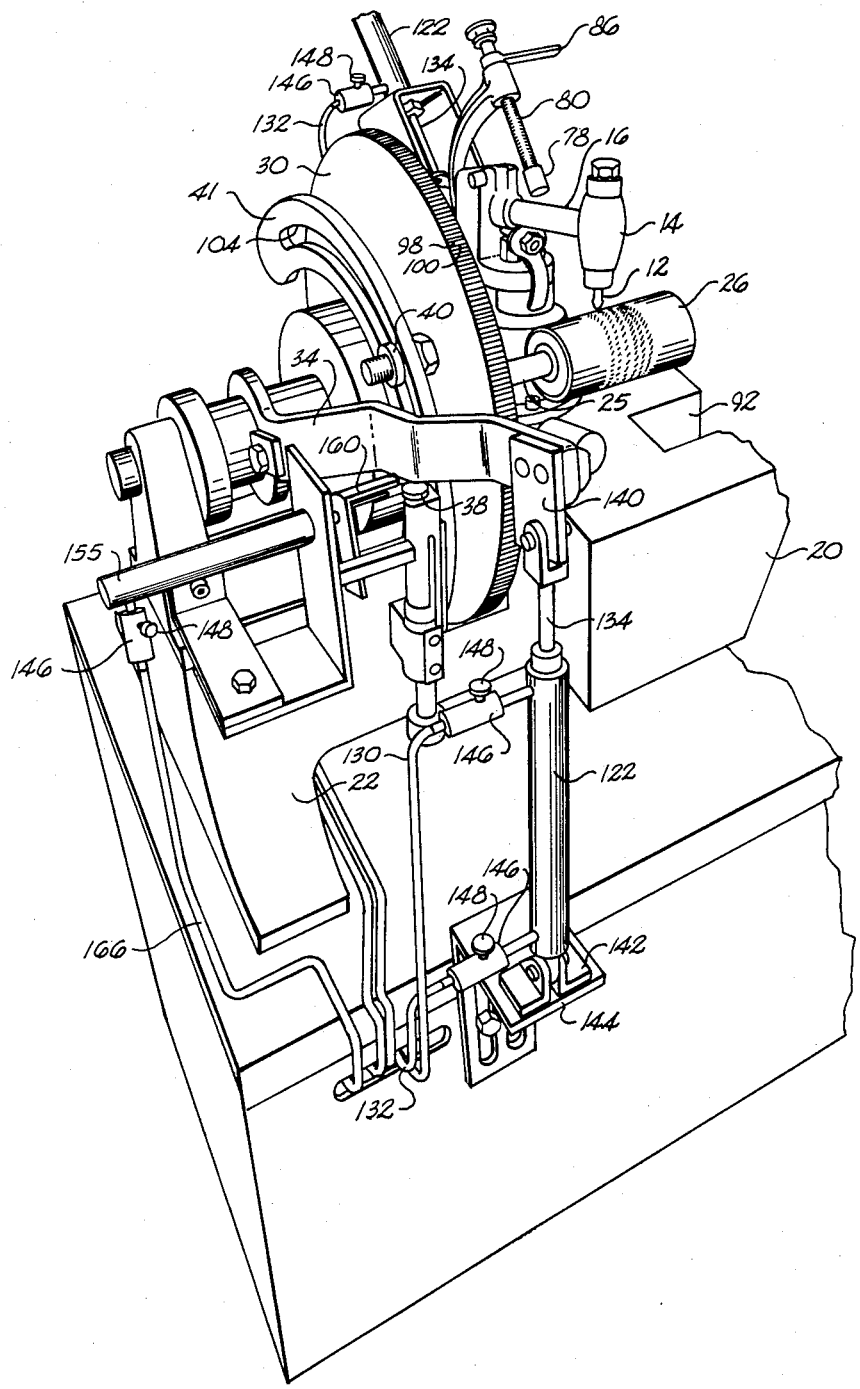
FIG. 3 is perspective partial view of the embodiment of the invention shown in FIG. 2.

In further accordance with the present invention, means are provided for rotating the cylindrical surface relative to the marking means. As embodied herein and shown for example, in FIGS. 2-4, 6, and 8, the means for rotating the cylindrical surface relative to the marking means comprises a pair of centers, one for rotatably mounting each journal 25 of the blank cylinder 26 to be patterned. One journal 25 can be seen in the view shown in FIG. 2, and the other journal 25 can be seen in the view shown in FIG. 6. As shown in FIG. 2, a center sleeve 114 is attached to a journal mounting support member 29 and houses one of the centers and one of the journals of the blank cylinder. As shown in FIGS. 4 and 6, a dog 116 holds the other journal and is fixed to the center of a metering disc 30. A plurality of alternating teeth 100 and indentations 98 are formed in the circumference of metering disc 30. Each indentation 98 is equidistantly spaced from each of the next adjacent indentations 98, and each tooth 100 is equidistantly spaced from each of the next adjacent teeth 100. One end of a shifting arm 34 is mounted to rotate about the central axis of metering disc 30. Attached to the other end of shifting arm 34 is a ratchet pawl 96 mounted to engage the teeth and indentations of metering disc 30. A second stop gauge 41 comprises a semi-circular member having a centralized concentric slot 104 formed therethrough for receiving one or more nut and bolt combinations 40. Second stop gauge 41 is secured to machine base 22 and is mounted between second shifting arm 34 and second metering disc 30 so that slot 104 is concentric with the central axis of metering disc 30. A lower arm stop 38 can be mounted to the side of machine base 22 to prevent further downward movement of shifting arm 34.

In further accordance with the present invention, first actuating means are provided for actuating the marking means, second actuating means are provided for actuating the translating means, and third actuating means are provided for actuating the rotating means. As embodied herein and shown for example in one or more of FIGS. 2-8, each of the first, second and third actuating means for actuating, respectively, the marking means, the translating means and the rotating means preferably comprises a source 120 of pressurized fluid. The source of pressurized fluid can be an air compressor or a hydraulic compressor which supplies pressurized fluid to each of the first, second and third actuating means via fluid lines 138. An air compressor capable of supplying up to 120 psi is suitable, and a supply of air at 40 psi is adequate in the preferred embodiment of the invention described in further detail hereafter. As shown schematically in FIG. 8, a filter 139 can be provided in line 138 to remove impurities from the pressurized fluid.

Figure 8:
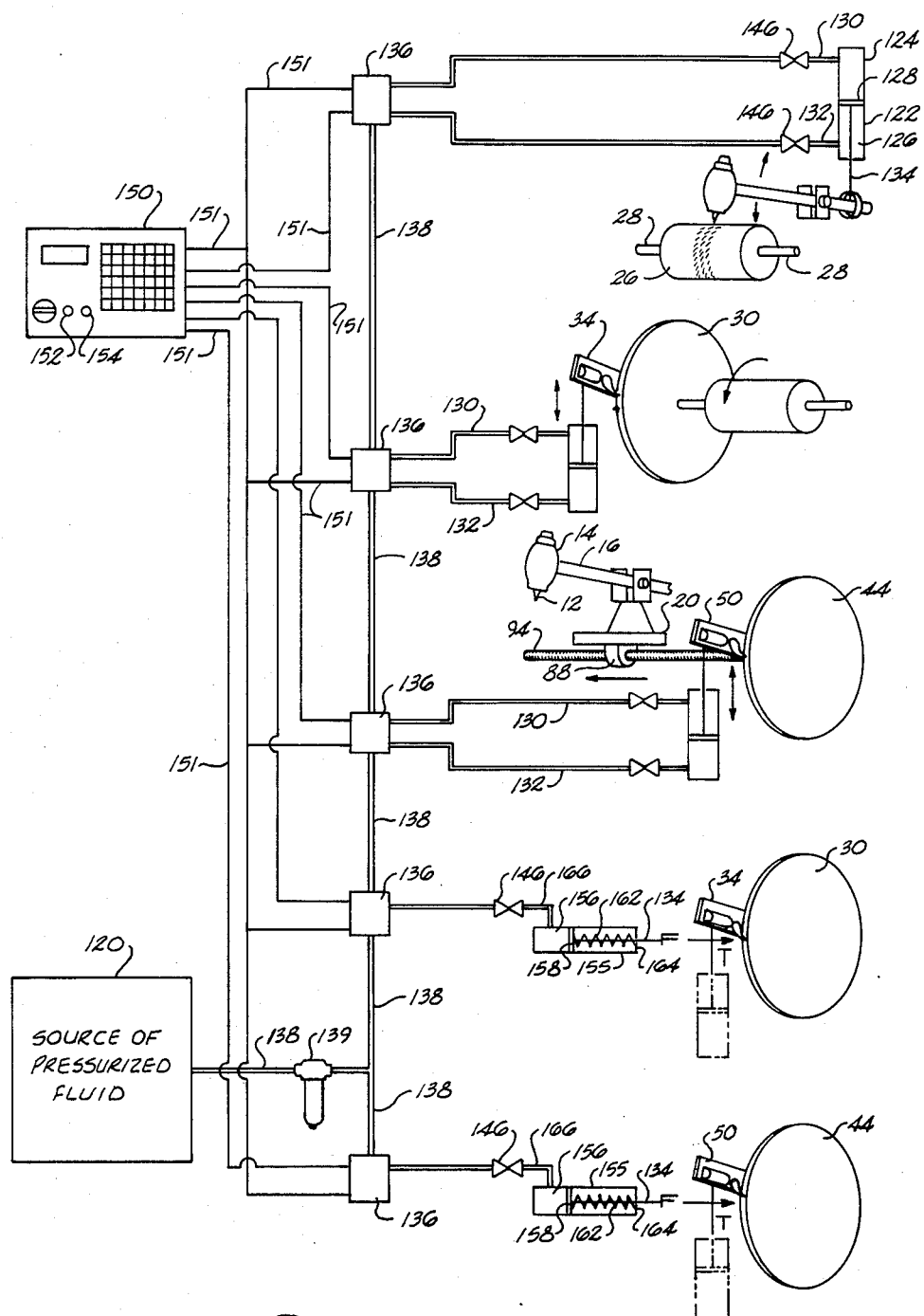
FIG. 8 is a schematic diagram of a preferred embodiment of the present invention.

The preferred embodiment of each of the first, second and third actuating means further comprises a pressure cylinder 122, such as shown for example in FIGS. 4 and 8. Each such pressure cylinder 122 has a first pressure chamber 124, a second pressure chamber 126, and a piston 128 slidable between first and second pressure chambers 124, 126. A fluid line 130 is connected to first pressure chamber 124, and another fluid line 132 is connected to second pressure chamber 126. One end of a piston rod 134 is attached to piston 128.

The preferred embodiment of each of the first, second and third actuating means further includes a dual action on/off valve 136 which is connected to fluid lines 130, 132. On/off valve 136 is electrically actuated to connect one or the other of fluid lines 130, 132 to source 120 of pressurized fluid via fluid lines 138. One example of a suitable on/off valve is a spring return solenoid valve, which has a single inlet path, two outlet paths, an electrically actuated solenoid for switching connections from the inlet to one of the two outlets, and a spring return mechanism. The spring biases the valve to connect a single input path to one of two output paths. The solenoid is electrically actuated to connect the input path of the valve to the other of the two output paths of the valve.

When electric current flows through the solenoid (not shown) of spring return solenoid valve 136 and on/off valve 136 is in the "on" position, on/off valve 136 connects fluid line 138 with fluid line 130 and thereby provides fluid from pressurized source 120 to first pressure chamber 124. At the same time, second pressure chamber 126 is vented to the atmosphere via fluid line 130 through on/off valve 136, and piston 128 moves toward second pressure chamber 126. When no current flows through the solenoid of on/off valve 136, the spring (not shown) switches the pathways connecting the inlet to the outlets of the valve into its "off" configuration. Then in the "off" configuration, on/off valve 136 connects fluid line 138 with fluid line 132 and thereby provides pressurized fluid from source 120 to second pressure chamber 126, while first pressure chamber 124 is vented to atmosphere via fluid line 130 through on/off valve 136. Piston 128 moves toward first pressure chamber 124 when on/off valve 136 is in the "off" configuration.

Reference now will be made specifically to the operation of the preferred embodiment of the actuating means. In the preferred embodiment of the first actuating means, the other end of piston rod 134 is positioned above the end of holder arm 16 opposite the end connected to punch holder 14. As piston rod 134 projects from pressure cylinder 122, it pushes against the end of holder arm 16 and raises punch 12 until holder arm 16 is restrained from further upward movement by upper arm stop 78. Then piston rod 134 retracts completely and instantaneously into pressure cylinder 122 and instantaneously releases the end of holder arm 16. Punch holder 14 and punch 12 falls, and punch 12 strikes the surface of cylinder blank 26, marking same.

In the preferred embodiment, piston rod 134 of the pressure cylinder embodying a component of the second actuating means is connected to the end of shifting arm 50 via an attachment flange 140, as shown in FIGS. 5 and 7. Similarly, the piston rod of the preferred embodiment of the pressure cylinder embodying a component of the third actuating means is connected to the end of shifting arm 34, as shown in FIG. 3. Attachment flange 140 is fixed near the free end of each shifting arm 34, 50. One end of each respective piston rod is pivotally attached to each respective attachment flange 140, the other end of each piston rod 134 being fixed to each piston 128 housed inside respective pressure cylinders 122. The end of cylinder 122 opposite the end from which piston rod 134 extends, is pivotally mounted to a cylinder mounting 142 which is attached to a machine platform 144 which is supported in turn by machine base 22. The structure and operation of the remaining components of the second and third actuating means are substantially identical to the structure and operation of the first actuating means described above. Moreover, as shown in FIG. 8, a single source of pressurized fluid can supply one or more actuating means by different arrangements of the fluid lines and the source.

In further accordance with the present invention, means are provided for adjusting the actuation rate of each of the first, second and third actuating means. As embodied herein and shown for example in FIGS. 2–6 and 8, the means for regulating rate of actuation of each of the first, second and third actuating means comprises a plurality of restriction valves. In the preferred embodiment of the invention, a restriction valve 146 is inserted into each fluid line 130, 132 connecting on/off valve 136 to one of the pressure chambers 124, 126 of each pressure cylinder 122. Each restriction valve is manually operated, as by a screw-type restriction knob 148, to reduce the flow area in the fluid line and thereby regulate the flow of pressurized fluid to each of the pressure chambers of each pressure cylinder.

In further accordance with the present invention, means are provided for selectively varying the pattern to be marked on the cylindrical surface. As embodied herein and shown for example in FIGS. 2, 3, 5 and 8, the selectively varying means preferably includes a source 120 of pressurized fluid, a pressure cylinder 155 having a pressure chamber 156 connected to the source, a slidable piston 158 forming one end of the pressure chamber, biasing means for biasing the piston against the force exerted by the pressure in the chamber, a restriction valve 146 regulating the flow of pressurized fluid from the source to the chamber, a piston rod 134 connected at one end to piston, and a shim 160 connected to the other end of piston rod 134. In the preferred embodiment of the invention shown perspectively in FIG. 3 and schematically in FIG. 8, the biasing means comprises a resilient spring 162 pressed against piston 158 and an end wall 164 of pressure chamber 156. Spring 162 keeps piston 158 near to the inlet of a fluid line 166 into pressure chamber 156. When fluid is supplied to pressure chamber 156, piston 158 moves against spring 162 and toward the end of cylinder 155 from which piston rod 134 projects from cylinder 155. As piston rod 134 projects from cylinder 155, shim 160 is inserted between a lower stop 38 and shifting arm 34 and accordingly changes the distance of travel of shifting arm 34. Similarly, as shown in FIGS. 5 (in phantom) and 8 (schematically), a shim 160 also can be inserted between lower stop 52 and shifting arm 50. Furthermore, though not shown in the drawings, a shim can be inserted between upper arm stop 78 and holder arm 16.

The change in the distance of travel of the shifting arm constitutes a change in distance corresponding to movement of the pawl a distance along the metering disc that is less than the distance between any two adjacent teeth of the metering disc. Thus, the insertion of a shim between the shifting arm and the lower stop for example, provides further control over the distance moved by the punch relative to the cylinder blank. This further refinement permits the operator greater flexibility in determining a pattern to be marked on cylinder blank 26.

In further accordance with the present invention, control means are provided for controlling the relative order of actuating each of the first, second and third actuating means and further for controlling the frequency of actuating each of the first, second and third actuating means. As embodied herein and shown schematically for example, in FIGS. 2 and 8, the control means of the present invention preferably comprises a programmable controller 150. An Omron S-6 brand programmable controller is an example of a suitable controller for the preferred embodiment of the invention. The Omron S-6 controller has a 512 word random access memory chip, 12 input leads and 8 output leads, 40 auxiliary relays, 8 timers with a range of from 0.1 to 99.9 seconds, 8 counters with a range of from 0 to 999, one high speed counter, and one reversible counter.

In the preferred embodiment of the invention, each on/off valve 136 is connected to an output lead of the controller via wires which are designated in FIG. 8 by the numeral 151. When operation of controller 150 generates a signal through one of the eight output leads, the solenoid of the on/off valve connected to that output lead receives an electric current, thus actuating the on/off valve into the "on" mode of operation.

Referring to FIG. 8, controller 150 is electrically connected to each of on/off solenoid valves 136 so that the actuation, i.e, the switching of each valve from the "on" position to the "off" position, is under the control of controller 150. Each switching of on/off valve 136 from on to off moves the respective piston rod 134 of the respective cylinder 122 under the control of that particular on/off valve either into or out of the cylinder. The predetermined number of strokes required to rotate, translate or raise the punch relative to the cylinder blank, depending upon the operation desired, is preprogrammed into the memory of controller 150. The relative order of operation of each on/off valve also is preprogrammed into the memory of the controller. Finally, the overall sequence of actuation of each on/off valve 136 is programmed into the memory of controller 150. Once this program is entered into the memory of controller 150, a start switch 152 on controller 150 is actuated, and controller 150 begins sending electrical signals according to the program in the memory, to the pertinent on/off valves to actuate same the predetermined number of times and in the predetermined order to produce the desired pattern by marking with punch 12 over the entire surface of cylinder blank 26.

Changing the programmed sequences of the Omron controller can be accomplished by using the internal counters, timers, and relays of the controller, i.e., by changing the relay logic of the controller. By programming different sequences and actuating each of the first, second and third actuating means and the selectively varying means, a predetermined number of times in a predetermined sequence, the operator can generate different patterns on the die or mill cylinder blank.

In operation, pressure cylinder 122 is actuated under the control of controller 150 which switches on/off valve 136 to alternately connect first pressure chamber 124 and second pressure chamber 126 of cylinder 122 and accordingly move piston rod 134 out of and into cylinder 122. The striking of piston rod 134 against holder arm 16 raises and lowers punch 12 so that punch 12 strikes and marks cylinder blank 26 each time piston rod 134 is retracted into cylinder 122. The number of strikes is also controlled depending upon the number of times on/off valve 136 is actuated by controller 150. A greater or lesser number of strikes of punch 12 is required depending upon the depth of the mark to be made and the position of upper arm stop 78.

As shown in FIG. 6, in one preferred embodiment of the invention, a loop 170 formed of metal, plastic, leather or other strong flexible material is attached to the end of piston rod 134 and encircles the end of holder arm 16 positioned beneath piston rod 134. This engaging structure enables piston 128 to positively pull on holder arm 16 when piston rod 134 retracts into cylinder 122. By adjusting the pressure of the fluid supply to cylinder 122 and the flow thereof using restriction valves 146, it is possible to have punch 12 strike cylinder blank 26 with a greater force than the force of gravity.

When the preprogrammed correct number of actuations of on/off valve 136 has been accomplished according to the number of strikes of punch 12 required to form the desired mark in the surface of cylinder blank 26, programmable controller 150 begins signalling another on/off valve 136 to actuate another cylinder 122 and cause piston rod 134 to move into and out of the cylinder a predetermined number of times and accordingly move ratchet pawl 96 over a predetermined number of teeth 100 for each outward projection of piston rod 134. Each inward retraction of piston rod 134 into cylinder 122 causes ratchet pawl 96 to engage metering disc 30 and rotate same counterclockwise in the view shown in FIG. 4. Programmable controller 150 is preprogrammed to determine the precise amount which punch is to be rotated around the longitudinal axis of cylinder blank 26. Once this rotation has been completed, then a new sequence of strikes by punch 12 will begin, or, depending upon the programming of programmable controller 150, cylinder blank 26 will be translated to allow punch 12 to mark the next circumferential portion of cylinder blank 26 to receive patterning.

Translation of cylinder blank 26 in the direction of its longitudinal axis is effected by a predetermined number of actuating signals being transmitted from programmable controller 150 to still another on/off valve and accordingly still another cylinder 122 is actuated to alternately project piston rod 134 and retract piston rod 134 and accordingly cause ratchet pawl 96 to ratchet over a predetermined number of teeth 100 of metering disc 44 and engage a particular tooth of metering disc 44 and rotate same in the clockwise direction as shown in the view of FIG. 5. Thus, depending upon the sequence programmed into the memory of controller 150, cylinder blank 26 can be translated after it has been rotated completely around the circumference of cylinder blank 26. Moreover, before the next series of strikes is actuated, cylinder blank 26 is preferably rotated so that the first strike around a circumferential portion of the cylinder does not align with the first strike around the adjacent circumferential portion of the pattern.

A controller such as the Omron S-6 is programmed by using the auxiliary relays in combination with the inputs, outputs, timers, counters, and the reversible counter (sometimes known as a sequencer that automatically resets to repeat the sequence) to provide a relay logic that will attain the desired pattern of output signals. In the preferred embodiment of the invention, the controller must generate a pattern of output signals that actuates each on/off valve the desired number of times in the desired order of actuation that will generate the desired pattern on the blank cylinder.

In the preferred embodiment of the invention, the reversible counter of the Omron controller is used to receive and send signals to the auxiliary relays, timers and other counters of the controller. When the reversible counter receives a signal from one of the relays, timers or counters, then the reversible counter sends a signal to the appropriate relay, timer or counter according to the predetermined sequence of operations required to produce the desired pattern on a complete circumferential portion (or band) of the cylinder blank. At the end of the sequence for patterning a complete circumferential band of the cylinder blank, the reversible controller is reset to restart this sequence from the begining.

In the preferred embodiment of the invention, the output signals of the Omron controller are used to actuate the solenoids of on/off valves 136 and place them in the "on" mode. The on/off valve actuating the punch receives an output signal followed by an output signal from the controller being received by the on/off valve which actuates the rotating means. Accordingly, the punch is raised as arm 34 moves upward in the clockwise direction of the view shown in FIG. 4. One of the timers controls when the output signal is shut off to the solenoid valve for the punch, and a second timer controls when the output signal is shut off to the solenoid valve for the rotating means. The timer for the rotating means is set to shut off the output signal and deactivate the solenoid before the solenoid for the punch valve is deactivated so that the punch will not strike until the rotation of the cylinder has ceased. A third timer ensures that actuation of the translating means does not begin until the punch has been raised above the surface of the cylinder blank. A fourth timer ensures that the shifting arm of the holder arm has begun its upward motion before withdrawing any shim 160 associated therewith. A fifth timer ensures that the punch is raised before the cylinder begins rotating to its next position.

In the preferred embodiment of the invention, one of the counters of the Omron controller is used to count the number of times that the on/off valves for the punch and the rotating means are actuated, i.e., the number of times that the cylinder blank is marked and rotated to the next position ready to receive another mark. When this first counter reaches a predetermined number, the punch will have marked a complete circumferential portion of the cylinder blank, and it will be appropriate to translate the cylinder blank a distance sufficient to expose the next circumferential portion of the cylinder to the striking field of the punch. Thus, when the reversible counter receives the signal from the first counter, the reversible counter sends a signal to initiate actuation of the translating means. A second counter counts until it records the number of ratcheted teeth 100 of metering disc 44 required to translate the cylinder blank the required distance. When the appropriate number of teeth have been ratcheted, the second counter signals the reversible counter which then signals to stop the actuation sequence for the on/off valve connected to the translating means. Then the reversible counter signals actuation of the rotating means until yet a third counter indicates that the first mark punched on ths circumferential portion will be struck at a different longitudinal axis than the first mark punched on the adjacent circumferential portion of the cylinder blank. This third counter signals a fourth counter which stops the entire apparatus upon receiving a predetermined number of such signals from the third counter, thus indicating that a sufficient number of circumferential portions of the cylinder have been patterned to complete the desired pattern to be formed on the cylinder blank. When a fifth counter attains a predetermined number of counts, it is appropriate to remove a shim from between a lower arm stop and a shifting arm 34 or 50.

Unlike a conventional apparatus, a single operator can simultaneously operate more than one apparatus constructed in accordance with the present invention. A number of apparatus can be programmed, and a single operator can monitor whether the preprogrammed sequence of shifting and marking steps is producing the desired pattern on the cylinder in question. The limiting factor in determining the number of apparatus of the present invention capable of being monitored simultaneously by a single operator is primarily dependent upon the extent to which the pattern being produced requires the operator to manually adjust one or more of the restriction valves during different parts of the pattern being struck by the punch. If the strike of the punch does not need to be varied by adjusting the restriction valve, less personal attention is required of the operator, and accordingly a greater number of apparatus can be monitored by a single operator. Since the salary paid to the operator is the largest single cost factor in the production of a single die or mill using a conventional apparatus, significant savings in production costs are possible by eliminating the number of operators required to produce the same number of patterned dies or mills using apparatus constructed in accordance with the present invention. Moreover, the apparatus of the present invention produces a patterned cylinder faster than a human operator using a conventional apparatus, because the apparatus doesn't tire, take lunch breaks, etc.

It will be apparent to those skilled in the art that various modifications and variations can be made in the apparatus for patterning a cylindrical surface of the present invention and in the various components thereof. Thus, it is intended that the present invention cover the modifications and variations of this invention provided they come within the scope of the appended claims and their equivalents.

What is claimed is:

1. A die indexing apparatus for patterning a cylindrial surface by punching an indentation into the cylindrical surface, the apparatus comprising:
   means for punching the surface;
   first actuating means for actuating said punching means;
   means for translating said punching means relative to the cylindrical surface;
   second actuating means for actuating said translating means, said second actuating means being independent of said first actuating means;
   means for rotating the cylindrical surface relative to said punching means;
   third actuating means for actuating said rotating means, said third actuating means being independent of said first actuating means and said second actuating means; and
   control means, said control means for controlling the relative order of actuating each said first, second and third actuating means and for controlling the frequency of actuating each said first, second and third actuating means.

2. An apparatus as in claim 1, wherein:
   said first actuating means includes a source of pressurized fluid, a first pressure chamber and a second pressure chamber, a first piston slidable between said first and second pressure chambers, and a first dual action on/off valve, said source being selectively connected by said first on/off valve to one of said first and second pressure chambers.

3. An apparatus as in claim 2, wherein:
   said second actuating means includes a second source of pressurized fluid, a third pressure chamber and a fourth pressure chamber, a second piston slidable between said third and fourth pressure chambers, and a second dual action on/off valve, said second source being selectively connected by said second on/off valve to one of said third and fourth pressure chambers.

4. An apparatus as in claim 3, wherein:
   said third actuating means includes a third source of pressurized fluid, a fifth pressure chamber and a sixth pressure chamber, a third piston slidable between said fifth and sixth pressure chambers, and a third dual action on/off valve, said third source being selectively connected by said third on/off valve to one of said fifth and sixth pressure chambers.

5. An apparatus as in claim 4, further comprising:
   a first restriction valve and a second restriction valve, said first restriction valve regulating the flow of pressurized fluid to said first chamber and said second restriction valve regulating the flow of fluid to said second chamber.

6. An apparatus as in claim 5, further comprising:
   a third restriction valve and a fourth restriction valve, said third restriction valve regulating the flow of pressurized fluid to said third chamber and said fourth restriction valve regulating the flow of fluid to said fourth chamber.

7. An apparatus as in claim 6, further comprising:
   a fifth restriction valve and a sixth restriction valve, said fifth restriction valve regulating the flow of pressurized fluid to said fifth chamber and said sixth restriction valve regulating the flow of fluid to said sixth chamber.

8. An apparatus as in claim 7, wherein:
said control means includes a programmable controller having a plurality of input and output leads, a plurality of timers, a plurality of counters, at least one high speed counter, and at least one reverse counter.

9. An apparatus as in claim 8, further comprising:
means for selectively varying the pattern to be punched on the cylindrical surface.

10. An apparatus as in claim 9, wherein said pattern varying means includes:
a source of pressurized fluid;
a seventh pressure chamber connected to said source;
a fourth slidable piston forming one end of said seventh pressure chamber;
biasing means for biasing said fourth piston against the force exerted by the pressure in said seventh chamber;
a seventh restriction valve regulating the flow of pressurized fluid from said source to said seventh chamber, a first piston rod connected at one end to said fourth piston; and
a shim connected to the other end of said first piston rod.

11. A die indexing apparatus for patterning a cylindrical surface by punching an indentation into the cylindrical surface, the apparatus comprising:
means for punching the surface;
means for translating said punching means in a first direction relative to the cylindrical surface;
means for translating the cylindrical surface in a second direction relative to said punching means;
first actuating means for actuating said punching means;
second actuating means for actuating said first directional translating means, said second actuating means being independent of said first actuating means;
third actuating means for actuating said second directional translating means, said third actuating means being independent of said first actuating means and said second actuating means; and
means for controlling the actuating sequence and frequency of each of said first, second and third actuating means.

12. An apparatus as in claim 11, wherein:
said first actuating means includes a source of pressurized fluid, a first pressure chamber and a second pressure chamber, a piston slidable between said first and second pressure chambers, and a first dual action on/off valve, said source being selectively connected by said first on/off valve to one of said first and second pressure chambers.

13. An apparatus as in claim 12 further comprising a first restriction valve and a second restriction valve, said first restriction valve regulating the flow of pressurized fluid to said first chamber and said second restriction valve regulating the flow of fluid to said second chamber.

14. An apparatus as in claim 11, wherein:
said control means includes a programmable controller having a plurality of input and output leads, a plurality of timers, a plurality of counters, at least one high speed counter and at least one reverse counter.

15. An apparatus as in claim 11, further comprising:
means for selectively varying the pattern to be marked on the cylindrical surface.

16. An apparatus as in claim 15, wherein said pattern varying means includes:
a source of pressurized fluid;
a pressure chamber connected to said source;
a slidable piston forming one end of said pressure chamber;
biasing means for biasing said piston against the force exerted by the pressure in said chamber;
a restriction valve regulating the flow of pressurized fluid from said source to said chamber:
a piston rod connected at one end to said piston; and
a shim connected to the other end of said piston rod.

17. An apparatus for patterning a cylindrical surface, the apparatus comprising:
means for marking the surface;
means for translating said marking means in a first direction relative to the cylindrical surface;
means for translating said marking means in a second direction relative to the cylindrical surface;
a source of pressurized fluid;
a first pressure chamber, a second pressure chamber, a first piston slidable between said first and second pressure chambers and connected to said marking means, and a first dual action on/off valve, said source being selectively connected by said first on/off valve to one of said first and second pressure chambers;
a third pressure chamber, a fourth pressure chamber, a second piston slidable between said third and fourth pressure chambers and connected to said first directional translating means, and a second dual action on/off valve, said source being selectively connected by said second on/off valve to one of said third and fourth pressure chambers;
a fifth pressure chamber, a sixth pressure chamber, a third piston slidable between said fifth and sixth pressure chambers and connected to said second directional translating means, and a third dual action on/off valve, said source being selectively connected by said third on/off valve to one of said fifth and sixth pressure chambers; and
a programmable controller for controlling when each of said first, second and third on/off valves connects said source respectively to one of said first and second pressure chambers, one of said third and fourth pressure chambers, and one of said fifth and sixth pressure chambers.

18. An apparatus as in claim 17, further comprising:
a first restriction valve connected between said first on/off valve and said first pressure chamber, and a second restriction valve connected between said first on/off valve and said second pressure chamber;
a third restriction valve connected between said second on/off valve and said third pressure chamber, and a fourth restriction valve connected between said second on/off valve and said fourth pressure chamber; and
a fifth restriction valve connected between said third on/off valve and said fifth pressure chamber, and a sixth restriction valve connected between said third on/off valve and said sixth pressure chamber.

19. A die indexing apparatus for patterning a cylindrical surface, the apparatus comprising:
means for punching the surface;

means for translating said punching means in a first direction relative to the cylindrical surface;

means for translating the cylindrical surface in a second direction relative to said puhching means;

first actuating means for actuating said punching means;

second actuating means for actuating said first directional translating means;

third actuating means for actuating said second directional translating means;

means for independently controlling the actuating sequence and frequency of each of said first, second and third actuating means; and means for selectively varying the pattern to be punched on the cylindrical surface, said pattern varying means including a source of pressurized fluid, a pressure chamber connected to said source, a slideable piston forming one end of said pressure chamber, biasing means for biasing said piston against the force exerted by the pressure in said chamber, a restriction valve regulating the flow of pressurized fluid from said source to said chamber, a piston rod connected at one end to said piston, and a shim connected to the other end of said piston rod.

* * * * *